United States Patent [19]
Scherle, deceased et al.

[11] 3,774,083
[45] Nov. 20, 1973

[54] APPARATUS FOR CONNECTING AN OUTPUT DEVICE TO A CIRCUIT TO BE MONITORED

[75] Inventors: Dieter Scherle, deceased, late of Planegg, Germany by Margaret Scherle, heir and administratrix for; Ursula Scherle, Planegg; Alexander Dieter Scherle, all of Planegg, Germany

[73] Assignee: Siemens Aktiengesellschaft, Berlin, Germany

[22] Filed: Aug. 15, 1972

[21] Appl. No.: 280,825

[30] Foreign Application Priority Data
Aug. 16, 1971 Germany.................. P 21 40 987.0

[52] U.S. Cl. .............................................. 317/157
[51] Int. Cl. .......................................... H01h 47/00
[58] Field of Search .................................... 317/157

[56] References Cited
UNITED STATES PATENTS
3,176,197  3/1965  Hoppe et al. ...................... 317/157
3,234,514  2/1966  Ward et al. ......................... 317/157
3,440,608  4/1969  Weld................................... 317/157

*Primary Examiner*—L. T. Hix
*Attorney*—Schuyler, Birch, Swindler, McKie & Beckett

[57] ABSTRACT

Apparatus for connecting an output device, e.g., a tape punch, to a switching installation, the operations of which are being monitored is described. Information on the instantaneous state of the switching installation is transferred into an intermediate store at predetermined times. Second storage switching elements which can be controlled in common with switching elements in the intermediate store form a storage chain. In order to interrogate the storage chain a search chain having switching elements, respectively, adapted to be excited over corresponding storage switching elements is provided. When a given search switching element responds, a corresponding output signal is produced, which actuates the appropriate punching device.

5 Claims, 4 Drawing Figures

APPARATUS FOR CONNECTING AN OUTPUT DEVICE TO A CIRCUIT TO BE MONITORED

BACKGROUND OF THE INVENTION

This invention concerns a circuit arrangement for connecting an output device, for example, a punching or perforating device, to a switching installation to be monitored, for example a telecommunication exchange installation.

With the increasing size and complexity of modern telecommunication exchange installations the problem of monitoring the various operating processes in such an installation becomes all the more important. A monitoring device for such types of exchange installations should fulfill the task of receiving data about the state of the exchange installation at a defined moment of time, without interfering with the operations of the exchange installation more than absolutely necessary. In addition, a monitoring device should make it possible to transfer the data collected at a certain moment from the exchange installation being monitored to an output device. This output device, which, for example, can be a tape punch, can then make available a record about the state of the exchange installation which can be used in many known ways. Thus, for example, inferences can be drawn from the recorded monitoring data about the busy states of the various parts within the exchange installation or, in the case of a program controlled exchange, about the running of an exchange program. The report made on the basis of the stored data further makes it possible to obtain information about the components participating in an exchange process, such as repeaters, registers, etc., as well as about the dial numerals which are the basis for establishing a connection. Further, engaged transmission bundles, transmission paths, detours or classifications can be systematically monitored and evaluated. For the case that the connection of the monitoring device does not occur automatically at specific moments, but rather is dependent on the occurance of a defect, the monitoring device can be used as an error printing device, whereby for example, the state of individual control devices at the moment when a defect occured is determined.

It is an object of this invention to provide means by which a monitoring device can be connected to a switching installation or the like, while causing minimum interference with the operations of the installation.

SUMMARY OF THE INVENTION

To achieve the aforementioned and other objects the invention makes use of the concept of transferring the data indicating the momentary state of the installation at prescribed moments into an intermediate store. The circuit arrangement according to the invention is characterized by the fact that second storage switching elements, which can be controlled with the relays of the intermediate store, form a storage chain. A search chain constituted by switching elements is present to examine the storage chain. The search switching elements are, respectively, attached to the storage switching elements of the storage chain. The search switching elements can be excited sequentially over a controlling device and over control elements of the storage switching elements in a sequence prescribed by the geometric arrangement of the control elements. By this means, the information contained in a storage switching element of the storage chain attached to the respective search element of the search chain is extinguished. With the response of a search element of the search chain, i.e., the drop-out of a storage switching element of the storage chain, an input of a shunting field which is relatively well known can be excited, over the outputs of which a well known output device, for example, a tape punch apparatus, can be controlled.

The fact that after the data are received in the intermediate store they are transferred into the storage chain, enables the arrangement according to the invention to offer the advantage that the intermediate store can be built very simply and can be connected to many points of the installation to be monitored.

A prescribed sequence for the scanning of the storage locations is obtained through the novel collaboration between the storage chain and the search chain, whereby only those storage locations are examined into which a datum was transferred. Empty, i.e., unoccupied, storage locations are skipped over, independent of their number and their position within the chain, without loss of time. Since, with the circuit arrangement according to the invention, the next occupied storage location is being searched even while a datum is being printed out, and with transfer of the next datum the datum contained in the preceding storage location is extinguished, there results a very high output speed.

BRIEF DESCRIPTION OF THE DRAWINGS

The principles of this invention will be more readily understood by reference to a description, given hereinbelow, of preferred embodiments constructed according to these principles. The description is illustrated by the drawings in which.

DETAILED DESCRIPTION OF THE DRAWINGS

A preferred embodiment of the invention is described hereinbelow in connection with FIGS. 1, 2 and 3.

Figure 1:
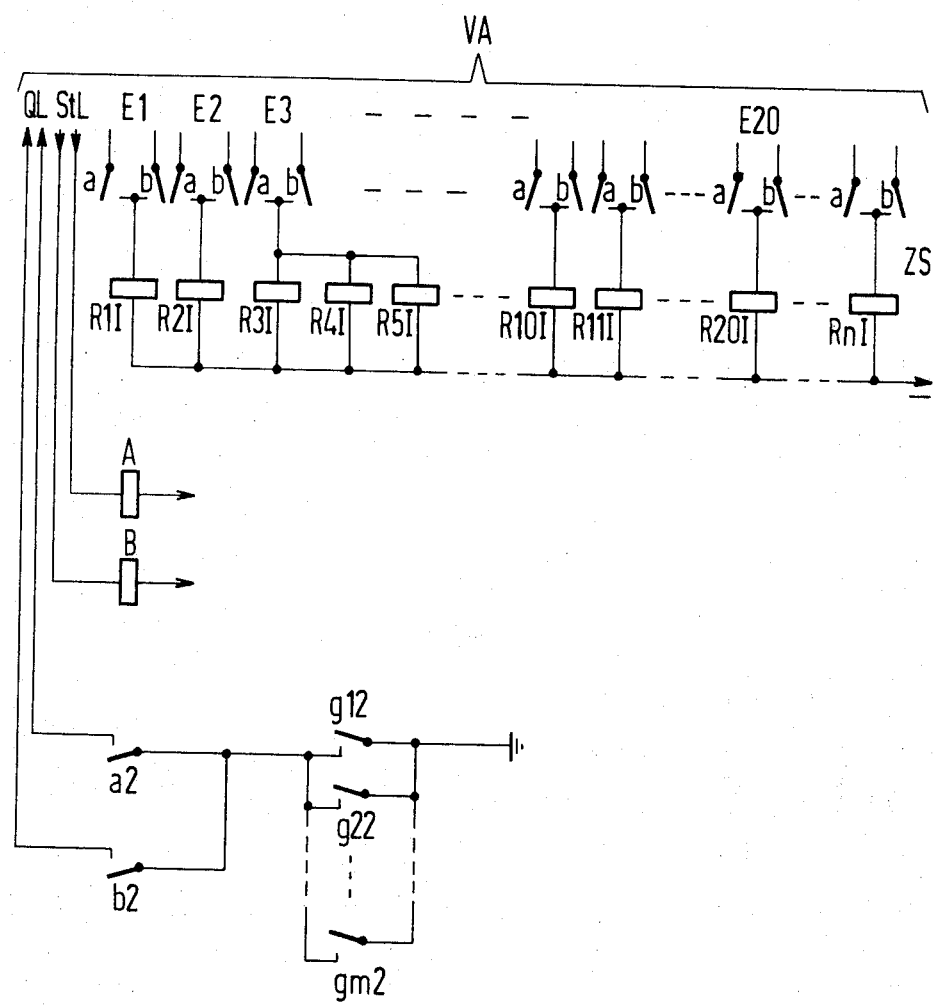
FIG. 1 is a schematic diagram of an intermediate store portion of the apparatus.

An intermediate store ZS shown in FIG. 1 contains relays R1 to R$n$ with their respective first windings R1I to R$n$I. The intermediate store is connected over connection contacts $a$ or $b$ to an exchange station or central office VA to be monitored, which is not shown in detail. Through the use of the two rows of switching contacts the intermediate store can be connected to different points of the installation to be monitored. For the control of connection contacts $a$ or $b$, the two relays A or B can be excited from the exchange station VA over a control line S$t$L. An acknowledgment signal arrives over line QL of the exchange station VA, over the contacts G12 to $gm$2, as is explained later, and this signal is interpreted as an indication of the completed transfer of data into the intermediate store, i.e., into the storage chain. This leads to triggering of the two relays A and B.

In the intermediate store, at least one storage location, i.e., a storage relay, is assigned to each datum presented by the exchange station. Thereby, it is possible to assign each datum presented a teletype signal. For the case that several teletype signals are to be emitted for one datum, several storage locations are attached to an input of the intermediate store. In the example of FIG. 1, this is the case with input E3; to it are attached three storage locations; namely, the storage relays R3, R4 and R5. Assuming that after activation of the connection contacts a by the exchange station VA over the inputs E1, E3 and E20, a datum is presented, which datum presentation occurs here in the manner that a positive potential is made available; accordingly, the corresponding relays R1, R3, R4, R5 and R20 are activated over their first windings R1I, R3I, R4I, R5I and R20I.

The datum indicating the state of the exchange installation at the moment of the connecting of the intermediate store is coupled to a storage chain. Storage chain SPK is shown in FIG. 2 and is formed by the two windings R1II to RnII of the storage relays R1 to Rn of the intermediate store ZS. This means that the relays R1, R3, R4, R5 and R20 are held over their own contacts $r1$, $r3$, $r4$, and $r20$ and the second windings R1II, R3II, R4II, R5II and R20II.

Figure 2:
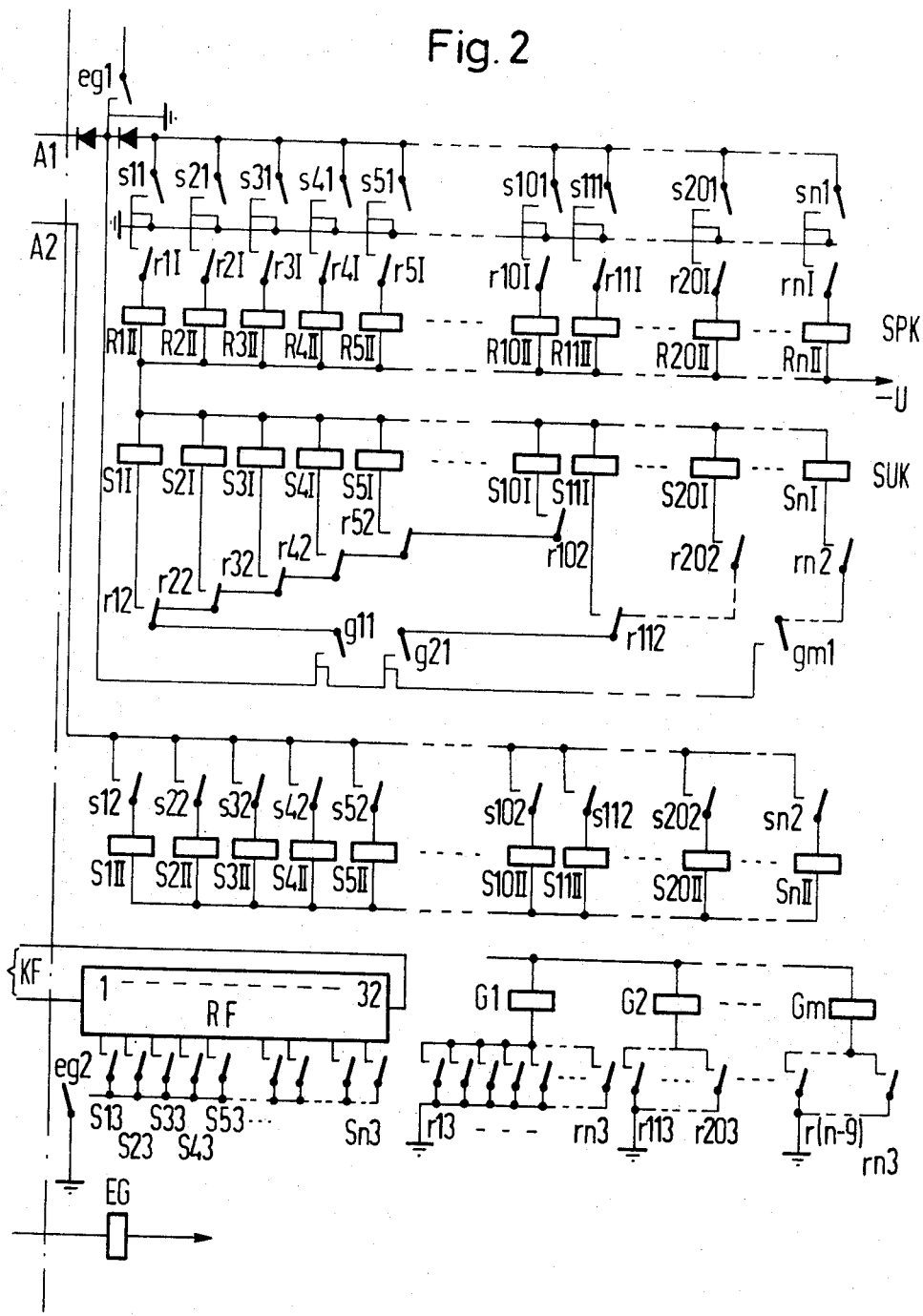
FIG. 2 is a schematic diagram of a first preferred embodiment of search and storage chains forming parts of the apparatus.

A search chain SUK is built as a relay chain in the example of FIG. 2, and the search elements are attached to the storage relays of the storage chain SPK, respectively. In this arrangement only the first search relay in the sequence of the excited storage relays is excited. For the following search relays which are attached respectively to excited storage relays, an excitation circuit is only prepared, not activated. This is achieved through the geometric arrangement of the second contacts $r1$ to $rn$ of the storage relays. Thus, it is of advantage not to connect all of these contacts to each other, but rather to connect them group-wise in series, and thereby create a group-wise distribution of the storage locations to be examined.

In the example of FIG. 2, 10 storage locations form a group. Thereby, a group switching means, preferably a group relay G1, G2 to Gm, is attached to each group, which can be excited, respectively, over parallel third contacts $r13$ to $r103$, $r113$ to $r203$, $r(n-9)3$ to $rn3$. The examination of a group of storage locations over contacts $g11$ to $gm1$ of the group relays is made possible only when the preceding group of storage locations has been examined. Proceeding from the above assumption, according to which the storage relays R1, R3, R4, R5 and R20 are excited, an excitation circuit for the first search relay S1 passes over: ground, $eg1$, $r12$, S1I, -U. Since, in accordance with the assumption, four storage locations within the first group and one storage location within the second group are occupied, the group relays G1 and G2 are excited; thus, their contacts $g11$ and $g21$ are activated. An acknowledgment signal passes to the exchange station VA over the second contacts $g12$ and $gm2$ of the group relays G1 to Gm, which contacts were mentioned previously in connection with FIG. 1, whereupon the storage relays of the intermediate store ZS lose current.

The output of the stored information was prepared with the response of the first search relay, in the example of FIG. 2 in that a first contact S11 of this relay switches on the holding circuit of the corresponding storage relay R1II to a first output A1 of the controlling device. Over a second output A2 of a controlling device pass the holding circuits for the second windings S1II TO SnII of the search relays S1 to Sn. The controlling device AE is shown in detail in FIG. 3. To inititate the output of information, a relay EG is excited from the controlling device AE, and a first contact $eg1$ of this relay connects the holding circuits of the second windings R1II to RnII of all storage relays R1 to Rn and the response circuits of the first windings S1I to SnI of the search relays S1 to Sn to the first output A1 of the controlling device AE. Thereby, during the search and print processes, the controlling of the storage and the search chain occurs only over the controlling device AE. The inputs of a signal shunting field RF of known construction are excited successively a second contact $eg2$, corresponding to the storage locations to be examined. A specific teletype signal, which is determined by the wiring in the shunting field RF, is assigned to each storage location over the shunting field.

Figure 3:
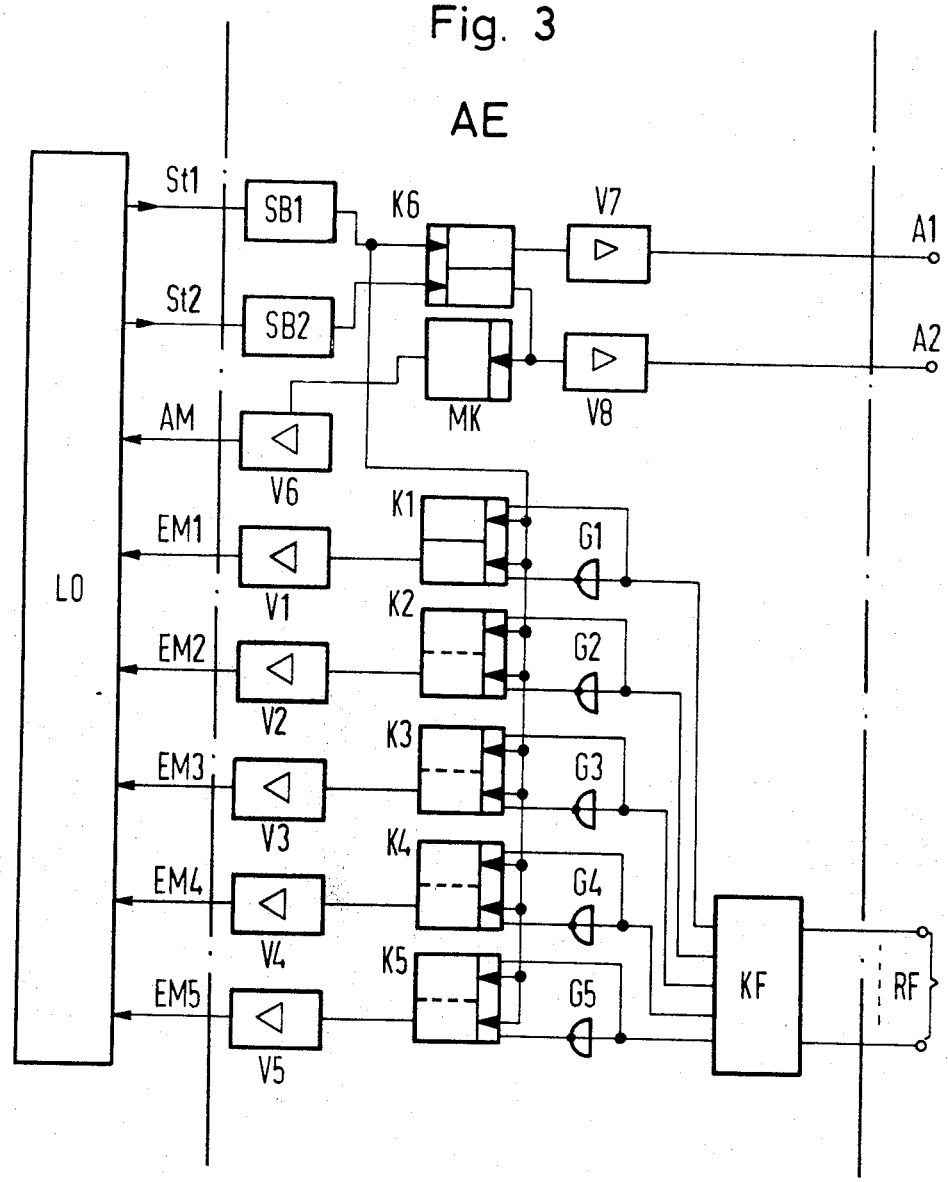
FIG. 3 is a schematic diagram of electronic means for controlling the examination of the data contained in the FIG. 3 storage chain and for controlling the data output device and FIG. 4 is a second preferred embodiment of the search chain described in conjunction with FIG. 2, which uses bistable multivibrators rather than relays.

The outputs 1 to 32 of the shunting field RF are connected with the inputs of a likewise known signal recognition field KF in FIG. 3, at whose outputs the bistable multivibrators K1 to K5 can be controlled according to a five-code chosen in the example. The inputs EM1 to Em5 of the receiving magnets of the punching device LO are excited over the outputs of the bistable trigger stages K1 to K5, for example over amplifier stages V1 to V5. This process occurs in detail as follows. For the transfer of data and for initiation of the printing process, an implulse is emitted to the controlling device AE over a control output S$t$1 of the punching device LO, which there controls a trigger stage K6 over a signal evaluator SB1 such than an amplifier V7 which is connected after it is blocked. Since its output forms the first output A1 of the controlling device AE, the holding circuit for the first storage relay R1 is opened. Simultaneously, a second amplifier V8 in the controlling device, which can also be controlled over the trigger stage K6, becomes conductive. The outputs of this amplifier V8 forms the previously mentioned second output A2 of the controlling device AE, over which, as described, the holding circuits for the search relays S1 to Sn (over their second windings) pass. Thus, while the first excited storage relay in the storage chain SPK drops out, the search relay S1 assigned to this storage relay is maintained over its second winding S1II, so that the steps corresponding to the first signal are presented in parallel to the punching device LO.

It is appropriate to excite the triggering magnet (input AM) of the punching device simultaneously with this procedure. For that purpose a monostable multivibrator MK is connected in the controlling device AE after the trigger stage K6, which emits an appropriate impulse to the input AM over an amplifier V6. After the process of printing the first signal, a second impulse is available over the control output S2 of the punching device LO, whereby simultaneously the impulse present at the control output S$t$1 is switched off. Thereby, the trigger stage K6 is switched again over a second signal evaluator SB2, so that now the amplifier V7 is conductive, and the amplifier V8 is blocked. Thereby, the holding circuit of the first search relay S1 is opened over the second output A2 of the controlling device AE, while the excitation circuit for the search relay S3 connected to the third storage location, which is prepared by the activated contact r32, is connected over the first output A1. The holding circuit for the third storage relay R3 now passes again over the first output A1 of the controlling device AE, over the now activated contact s31.

With the change of impulses at the control outputs St1 and St2 of the punching device, and therewith with the change of impulses at the first and second outputs of the controlling device AE, the described processes are repeated. Thus, while the storage relay R3 drops out, because its holding circuit is opened, the search relay S3 attached to this storage location is maintained. The teletype signal parallel to the punching device LO is presented over the shunting field RF, at which now the contact s33 excites an input. With the succeeding impulse change the search relay again drops out, while the succeeding search relay S4 responds over the preparatorily excited contact r42.

If the last storage relay within a group, i.e., in the example of FIG. 2, the relay R5, has dropped out, then the group relay G1 also declines and prepared the search and inquiry process for the succeeding group with its first contact g11. In particular, the processes proceed in the described manner. Thus, the unoccupied locations in the storage chain are skipped without loss of time.

Figure 4:
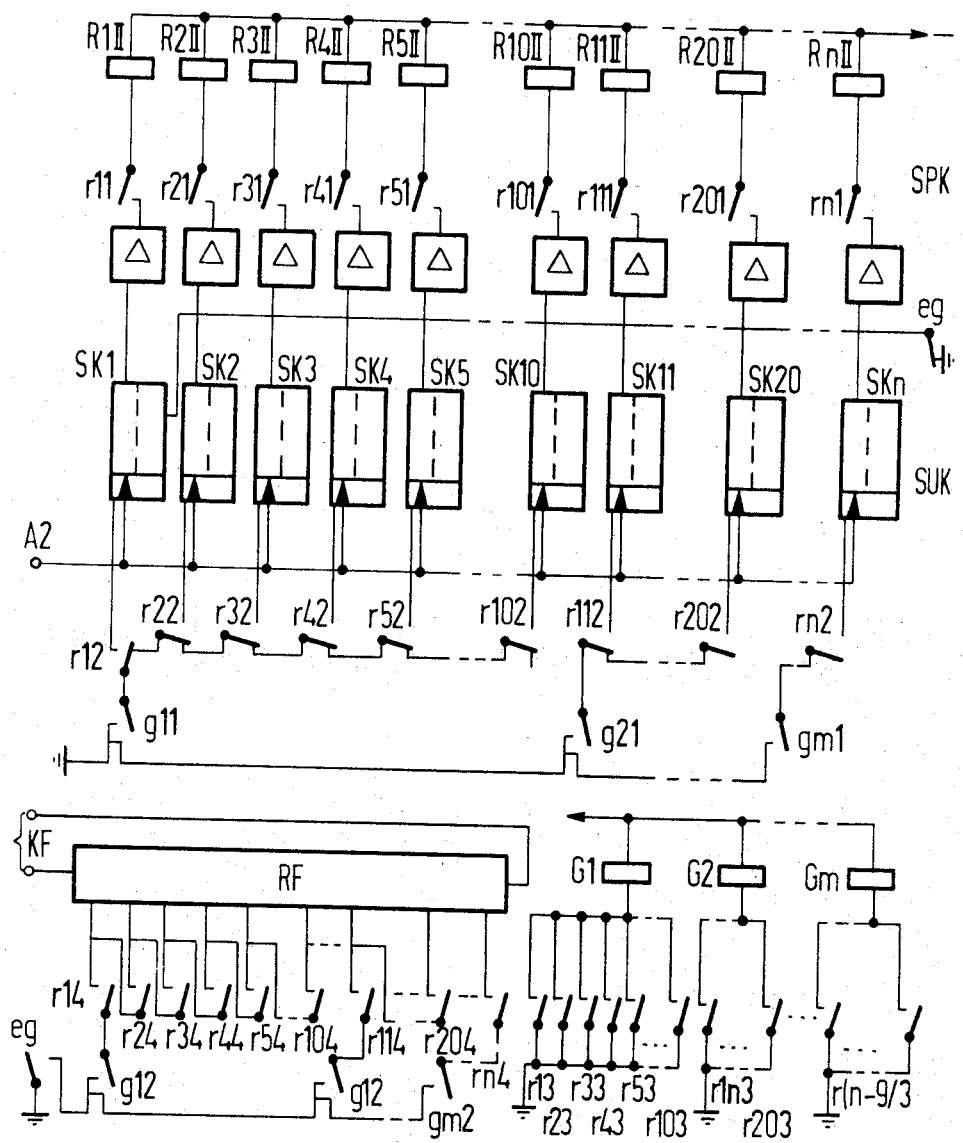

The invention described herein is not limited to arrangements in which relay chains are used as search chains. Rather, it is within the framework of the invention that the individual search elements which form the search chain can be electronic elements, for example bistable trigger stages or multivibrators. An example of this idea is shown in FIG. 4. In this figure, where reference is made to previously discussed components, the same reference letters and numerals are used.

In contrast to the search chain of FIG. 3, the search chain of FIG. 4 contains bistable multivibrators SK1 to SKn. In this case also the geometrical arrangement of the contacts of the storage relays insures that a multivibrator prepared for switching only moves into its other position when an occupied storage location, which preceded in the sequence has been examined. In contrast to a relay search chain, the search chain formed of bistable trigger stages offers the advantage of a higher operational speed, since the response time of the search relays is eliminated. Moreover, there results a further simplification of the circuit in that the holding circuits for the storage relays do not have to be opened over their own inputs from the controlling device AE after examination of a datum, but rather the switching of the applicable bistable multivibrator in the search chain is utilized for that purpose. The output of the teletype signals assigned to the individual pieces of information over the shunting field RF occurs in the described manner over the punching device LO of FIG. 3.

With use of a punching device which emits no back signals during a printing process, it is appropriate to provide an additional pulse generator, which emits the impulses necessary for the examination with a periodic time which corresponds to the printing speed.

The preferred embodiments described hereinabove are considered to be only exemplary and not limiting. The described embodiments may be modified or changed with such modifications and changes being within the scope of the invention as defined by the appended claims.

It is claimed:

1. Apparatus for connecting an output device to a switching installation or the like for monitoring the condition of said installation, comprising:
   intermediate storage means comprising a plurality of switching elements for receiving and storing information on the condition of said installation,
   second storage means comprising a plurality of switching elements controlled in common with said intermediate storage switching elements,
   search means comprising a plurality of switching elements operable in response to the switched condition of said second storage switching elements for interrogating said second storage means,
   a plurality of first contact means operated by said second storage switching elements for connecting said second storage switching elements to said search switching elements, said contact means being arranged to successively operate said search switching elements in a sequence determined by a predetermined geometric arrangement of said contact means and
   control means responsive to actuation of ones of said search switching elements for producing output signals for actuation of said output device in accordance with the information stored in said second storage means.

2. The apparatus defined in claim 1 wherein said search switching elements are formed into groups, said search switching elements having excitation circuits and further comprising group switching means for interrupting said excitation circuits of those of said search switching elements not undergoing interrogation and means for communicating an acknowledgment signal to said installation upon transfer of information into said second storage means.

3. The apparatus defined in claim 1 comprising:
   a plurality of first relays, each having first and second excitation windings, said first windings being connected to said installation and forming said intermediate store, said second windings forming said second storage means,
   second contact means operated, respectively, by said relays for forming holding circuits for said second storage means, said holding circuits being operable by a first output of said control means and
   third contact means operated, respectively, by said relays for actuating said group switching means.

4. The apparatus defined in claim 3 wherein said search means comprises a plurality of second relays, each having first excitation windings responsive to said first relays for interrogation thereof and second excitation windings forming holding circuits for said second relays, said second windings of said second relays being operable from a second output of said control means, said control means including means for alternately actuating said first and second outputs in synchronism with the frequency of operation of said output device.

5. The apparatus defined in claim 3 wherein said search means comprises a plurality of bistable multivibrators energized by said first contact means and triggered by said second output of said control means, the outputs of said bistable multivibrators forming a part of the holding circuits for said first relays.

* * * * *